(12) United States Patent
Shen

(10) Patent No.: US 8,910,877 B2
(45) Date of Patent: Dec. 16, 2014

(54) INDUCTIVE IDENTIFICATION CARD

(76) Inventor: Chih Hao Shen, New Taipei (TW)

( * ) Notice: Subject to any disclaimer, the term of this patent is extended or adjusted under 35 U.S.C. 154(b) by 188 days.

(21) Appl. No.: 13/620,300

(22) Filed: Sep. 14, 2012

(65) Prior Publication Data

US 2014/0076977 A1    Mar. 20, 2014

(51) Int. Cl.
*G06K 19/02* (2006.01)

(52) U.S. Cl.
USPC ........... 235/488; 235/435; 235/487; 235/449; 235/493; 235/380

(58) Field of Classification Search
CPC ....... B42D 15/10; B41M 3/14; G06Q 20/346; G06K 9/00; G06K 7/082; G06K 7/08; G07F 7/08; G07F 7/0806; G07F 7/0813; G07F 7/082; G07F 7/086; G07D 7/0006; G07D 7/0013; G07D 7/125; G07D 7/2025; G07D 7/20; G07D 7/2016
USPC .................. 235/488, 435, 487, 449, 493, 380
See application file for complete search history.

(56) References Cited

U.S. PATENT DOCUMENTS 4,455,484 A *  6/1984  Whitehead .................... 235/493

* cited by examiner

*Primary Examiner* — Kristy A Haupt
(74) *Attorney, Agent, or Firm* — Muncy, Geissler, Olds & Lowe, P.C.

(57) ABSTRACT

An inductive identification card on which a card holder's identifying information is recorded in order to recognize the holder's identity via a visual inspection. The identification card is provided with a sensor film on the surface having sensor points which are distributed on its exterior, blocking points corresponding to the identifying information on the identification card, and locally changing electrical responses of sensor points in advance so that different response signals corresponding to detective signals which are applied to the sensor film are generated by the blocking points and peripheral regions, respectively. Authenticity of the identification card and the card holder's identity are recognized by determining locations of response signals.

9 Claims, 5 Drawing Sheets

INDUCTIVE IDENTIFICATION CARD

BACKGROUND OF THE INVENTION

1. Field of the Invention

The present invention relates to an identification card and, in particular, an inductive identification card which quickly and precisely recognizes authenticity of an identification card and a card holder's identity corresponding to the identification card as a threshold of the holder further exercising his/her rights, and which provides satisfactory security.

2. Description of the Prior Art

The prior card-type identity recognition technology designs an identification card on which a card holder's basic identifying information, e.g., photo and name, is written or printed. During a visual inspection, conformity between the identifying information on the identification card and the card holder is checked, to allow the holder to exercise his/her rights when identifying information on the identification card is identical to the holder's identity.

However, the identification card of the prior art does not provide adequate security due to its simple structure, which can be easily imitated. Also, visual recognition on the basis of an inspector's judgement to check the identity of a person against the identification card frequently results in errors. Furthermore, other security measures such as having an additional card number and seal designed in the prior identification card still provide limited security and do not avoid counterfeiting.

In addition, time-consuming visual recognition frequently encourages erroneous judgments when huge crowds swarm simultaneously.

In virtue of progressive technologies, another type of identification card has matured and been extensively applied. These identification card products are based on digital recording, such as IC and proximity cards, are now available. The IC card or the proximity card, which rely on electronic sensor technologies, can be quickly and precisely operated and are not easily counterfeited because of integrated digital encryption. Because the identification information is a digital record, this type of identification card must be applied in conjunction with an expensive reader and may therefore not be affordable for general users. Moreover, digital records which are usually used in recognizing authenticity of an IC card or a proximity card only fail in demonstrating a true card holder.

It can be seen from above descriptions that the identification cards of the prior art have many drawbacks, are not satisfactorily designed, and deserve to be further improved.

The inventor who considering shortcomings of prior arts has made all efforts to research, produce and develop the present invention of an inductive identification card.

SUMMARY OF THE INVENTION

The object of the present invention is to provide an inductive identification card satisfactorily and precisely recognizing identity shown on a personal certificate.

The other object of the present invention is to provide an inductive identification card effectively accelerating recognition of a personal certificate and fulfilling demands for identity recognition of an enormous population.

The further object of the present invention is to provide an inductive identification card which is used in conjunction with information held in a chip to compare a certificate holder's identity and optimize precision of identity recognition.

The inductive identification card realizing the above purposes comprises an identification card on which a card holder's identifying information is recorded, so as to realize identity recognition via a visual inspection. The present invention is particularly provided with a sensor film on the identification card's surface. This sensor film, common in various touch panel products, comprises sensor points which are distributed on its exterior and which are touched or compressed to change the sensor points' electrical responses for response locations on the sensor film detected by a corresponding external readout device. Depending on this characteristic and the identifying information held on the identification card's surface, the present invention is also provided with blocking points on the sensor film which change electrical responses of the local sensor points beforehand, so that different response signals corresponding to detective signals which are applied to the sensor film are generated by the blocking points and peripheral regions, respectively.

As such, a corresponding readout device in which the identification card is accommodated will emit optical or electrical detective signals for response signals generated out of the sensor points and read by the readout device. The blocking points which have been arranged in the identifying information area on the identification card's surface are capable of emitting response signals different from those of peripheral regions and are compared with the identifying information saved on the identification card according to positions of the response signals, so that authenticity of the identification card is determined and not falsified. With authenticity of the identification card recognized, the identifying information, e.g., a card holder's ID photo, can be used in comparing with a card holder to recognize authenticity of the holder's identity.

BRIEF DESCRIPTION OF THE DRAWINGS

Referring to detailed descriptions and appended drawings with respect to the present invention for further comprehending technical contents, purposes and effects of the present invention. The appended drawings are.

DETAILED DESCRIPTION OF THE PREFERRED EMBODIMENT

The present invention will be further explained hereinafter with appended drawings integrated.

Figure 1:
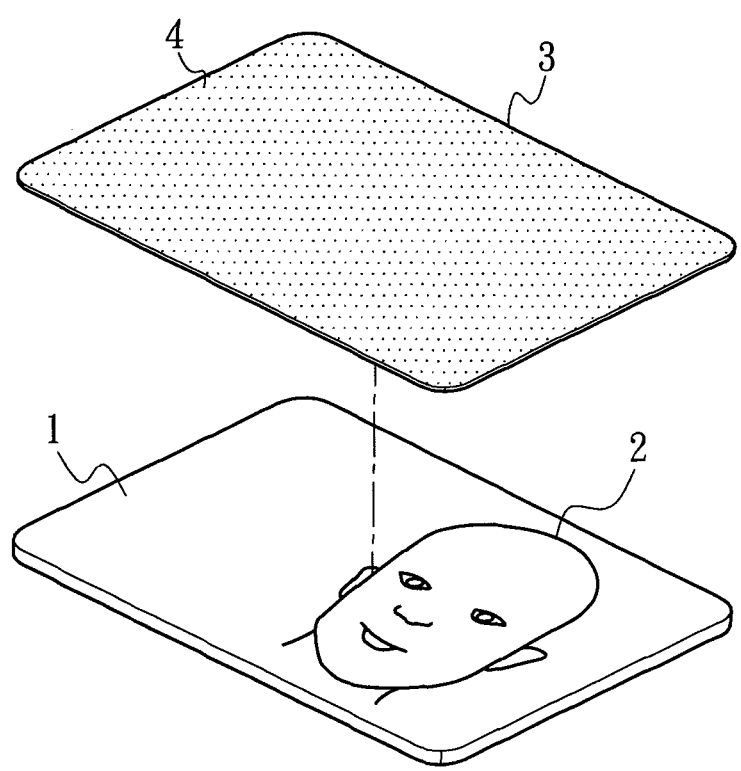
FIG. 1 is an exploded perspective view of the present invention.

Referring to FIG. 1, this figure provides an inductive identification card and is applicable to diversified demands to recognize an individual's identity. The present invention comprises an identification card 1 on which a card holder's identifying information 2 is recorded, so as to realize identity recognition of the card holder (not shown in this figure) via a visual inspection. The identification card 1 is provided with a sensor film 3 on the surface. The sensor film 3 comprises sensor points 4 which are distributed on its exterior and which are touched or compressed to activate electrical responses.

For example, different signals based on a conducting (non-conducting) state of sensor points 4 are responded with detective signals applied to the sensor film 3.

Figure 2:
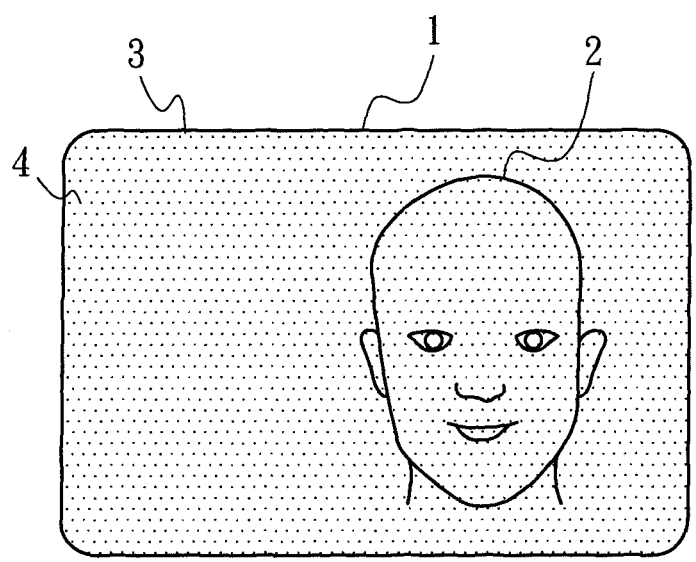
FIG. 2 is a front view illustrating a structure of the present invention.
Figure 3:
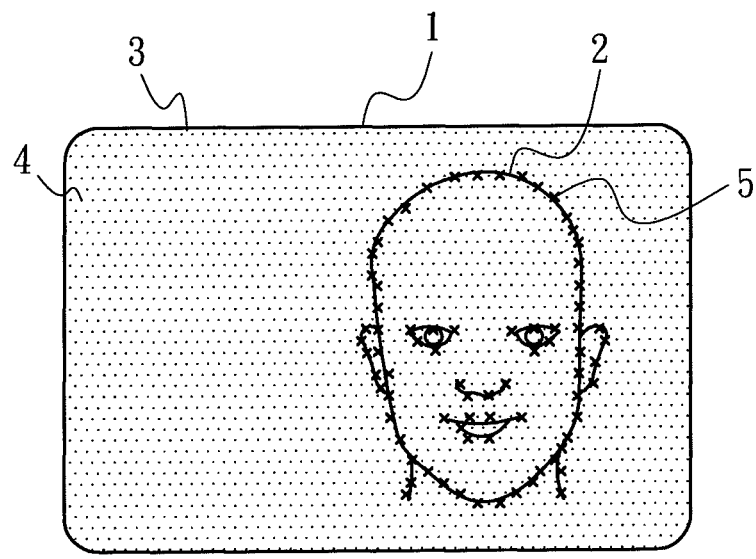
FIG. 3 is a schematic illustration for the blocking points disposed in the present invention.
Figure 4:
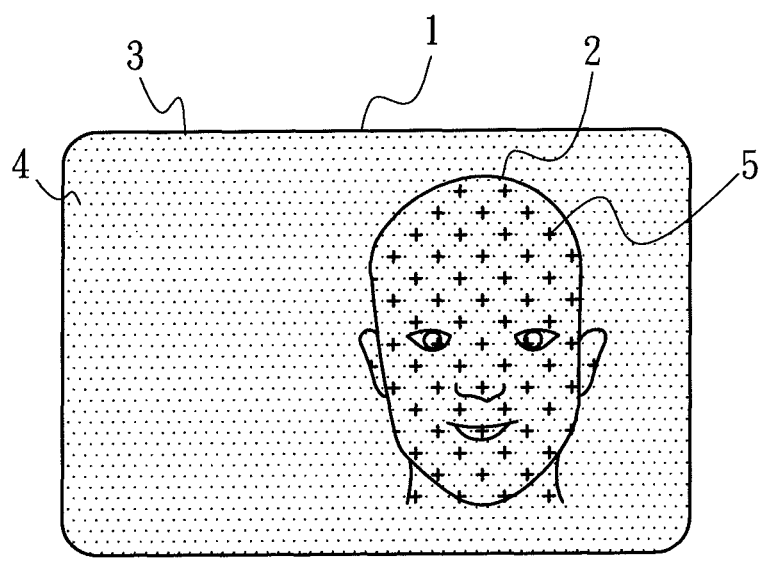
FIG. 4 is an alternative schematic illustration for the blocking points disposed in the present invention.

FIGS. 2-4 illustrate functions of the sensor film 3, which is provided with blocking points 5 for identifying information 2 on the identification card 1. The blocking points 5 locally change electrical responses of sensor points 4 in advance so that different response signals corresponding to detective signals are emitted by the blocking points 5 and peripheral regions, respectively. As such, those response signals are compared with identifying information 2 recorded on the surface of the identification card 1 for realizing identity recognition.

With current electronic technologies integrated, the above-mentioned identification card 1 can be an electronic card such as an IC card and/or proximity card in which all types of a card holder's identifying information 2 are stored. Identify recognition is carried out by comparing these types of identifying information 2 with the identifying information 2 saved on the surface of the identification card 1. As mature technical products, the electronic cards such as IC or proximity cards are beyond the scope to be protected herein and not described hereinafter.

The identifying information 2 recorded on the surface of the identification card 1 can be characters or patterns and preferably a card holder's ID photo in virtue of those characters or patterns, e.g., trade marks or service marks, easily falsified in consideration of the identification card 1.

Furthermore, the distribution density of the sensor points 4 is adjusted as required. For example, a higher distribution density allows wider blocking points 5 to be designed for robust safety in the identification card 1. The blocking points 5 can be easily arranged in a linear distribution, i.e., the blocking points 5 are continuously disposed along outlines or center lines of the identifying information 2 to develop a line-based pattern (FIG. 3). Alternatively, the blocking points 5 can be distributed as a complicated planar area, i.e., the blocking points 5 are intensively distributed inside the contour of identifying information 2 so as to develop a planar appearance (FIG. 4).

Figure 5:
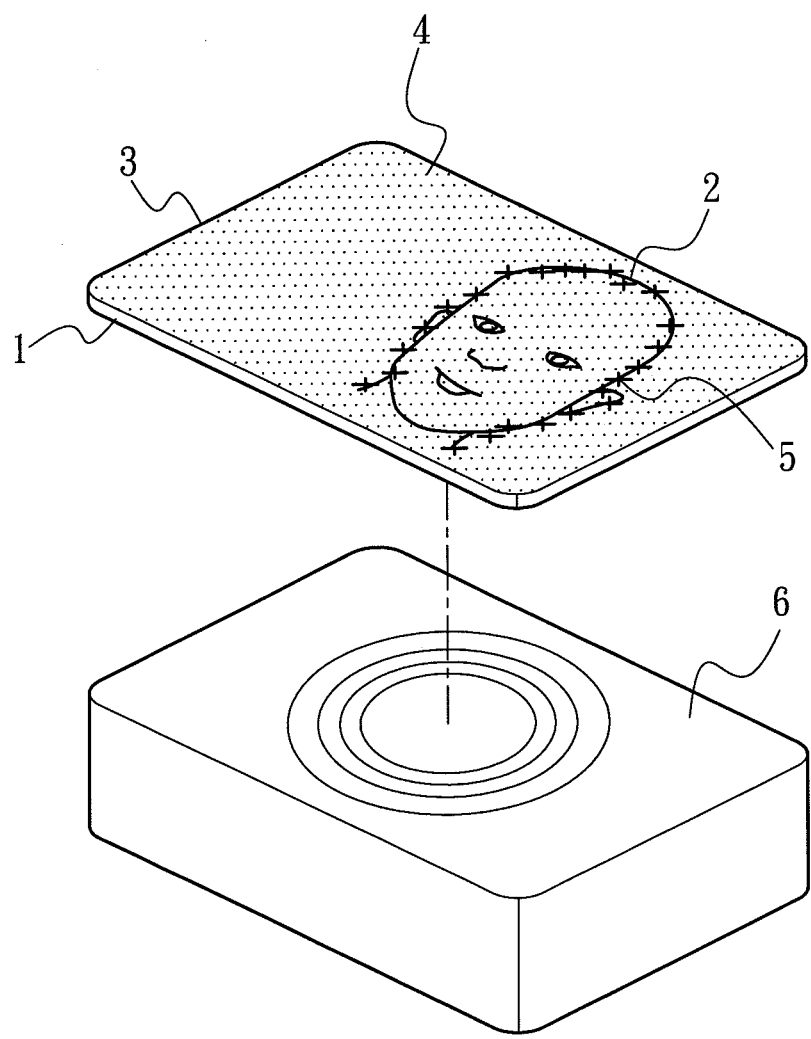
FIG. 5 illustrates the present invention under operation.

As shown in FIG. 5, the identification card 1 should be used in conjunction with a readout device 6 which applies detective signals to the sensor film 3 and reads response signals therefrom for recognition of the identifying information 2.

Figure 6:
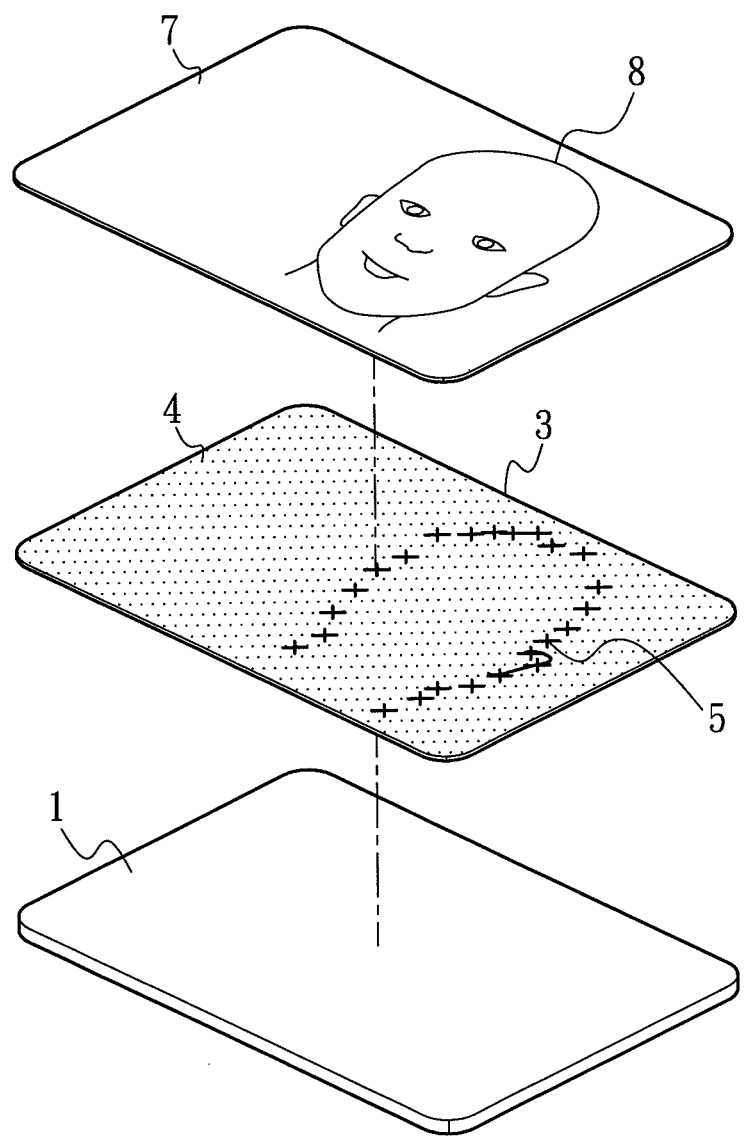
FIG. 6 is a schematic illustration for a protective film disposed in the present invention.

As shown in FIG. 6, the identification card 1 is provided with one layer of sensor film 3 only which is frequently rubbed or touched and which is unfavorable to functions of the sensor film 3. Accordingly, an extra protective film 7 can be laid on the sensor film 3 to maintain availability of the sensor film 3.

In a further application, the protective film 7 is a transparent film with a certain thickness designed and an identifying plane 8 defined. The identifying plane 8 mainly contains, for example, an ID photo of a person holding the identification card 1, and consists of various shades of lines on the protective film 7 according to hues and outlines shown on the ID photo and is developed to be a 3-dimensional picture. Furthermore, in order to realize identity recognition, the blocking points 5 are also disposed at the sensor film 3 in accordance with the area of the identifying plane 8.

Additionally, the sensor film 3 relies on distribution of the identifying information 2 to record the sensor points 4 covered by the identifying information 2 one after another, encode and calculate distributive positions of the blocking points 5, and arrange them onto the sensor film 3.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An inductive identification card comprising:
an identification card with a card holder's identifying information recorded on the identification card's surface;
a sensor film disposed on said identification card's surface, comprising blocking points corresponding to identifying information on said identification card, and emitting response signals different from those of peripheral regions to verify authenticity of said identification card when detective signals are applied to said sensor film.

2. The inductive identification card according to claim 1, wherein said sensor film comprises distributive sensor points whose electronic responses can be locally changed by said blocking points in order to make response signals from said blocking points different from those of the peripheral regions.

3. The inductive identification card according to claim 1, wherein said sensor film has said distributive blocking points corresponding to said identifying information, e.g., characters, patterns, and preferably a card holder's ID photo, on said identification card's surface.

4. The inductive identification card according to claim 1 wherein said blocking points are continuously disposed along outlines or center lines of said identifying information to develop a line-based appearance.

5. The inductive identification card according to claim 1, wherein said blocking points are intensively distributed inside the contour of said identifying information, so as to develop a planar appearance.

6. The inductive identification card according to claim 1, wherein said detective signals are applied to said sensor film by a corresponding readout device so that response signals out of said sensor film are read for recognizing said identifying information.

7. The inductive identification card according to claim 1, wherein said sensor film is provided with a protective film to keep integrity of said sensor film.

8. The inductive identification card according to claim 1, wherein said sensor film is provided with a protective film on which there is an identifying plane consisting of various shades of lines for a 3-dimensional effect and said blocking points are disposed as per said identifying plane.

9. The inductive identification card according to claim 1, wherein said blocking points are distributed in areas based on said identifying information through encoding.

* * * * *